(12) United States Patent
Gueniot et al.

(10) Patent No.: US 11,074,724 B2
(45) Date of Patent: Jul. 27, 2021

(54) GPU CALCULATION OF SIGNED DISTANCE FIELDS

(71) Applicant: Microsoft Technology Licensing, LLC, Redmond, WA (US)

(72) Inventors: Alexandre Gueniot, Mountain View, CA (US); Cameron David Kikoen, Milpitas, CA (US); Gilberto Aristides Apodaca Aragon, San Jose, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 28 days.

(21) Appl. No.: 16/213,525

(22) Filed: Dec. 7, 2018

(65) Prior Publication Data

US 2020/0184687 A1 Jun. 11, 2020

(51) Int. Cl.
*G06T 11/00* (2006.01)
*G06T 1/20* (2006.01)
*G06T 11/20* (2006.01)
*G06K 9/46* (2006.01)

(52) U.S. Cl.
CPC ........ *G06T 11/001* (2013.01); *G06T 2210/12* (2013.01)

(58) Field of Classification Search
CPC combination set(s) only.
See application file for complete search history.

(56) References Cited

U.S. PATENT DOCUMENTS

| 8,576,222 | B2* | 11/2013 | Handley | G06F 3/016 345/419 |
| 9,177,225 | B1* | 11/2015 | Cordova-Diba | G06T 5/00 |
| 2004/0189642 | A1* | 9/2004 | Frisken | G06T 11/203 345/443 |
| 2010/0231583 | A1* | 9/2010 | Furukawa | G01B 11/24 345/419 |

(Continued)

OTHER PUBLICATIONS

Green, Chris. 2007. Improved Alpha-Tested Magnification for Vector Textures and Special Effects. ACM SIGGRAPH 2007 papers. International Conference on Computer Graphics and Interactive Techniques. 10.1145/1281500.1281665.

(Continued)

*Primary Examiner* — Wesner Sajous
(74) *Attorney, Agent, or Firm* — Medley, Behrens & Lewis, LLC

(57) ABSTRACT

Representative embodiments disclose mechanisms to create a distance field within a Graphics Processing Unit. This allows distance fields to be used in real time environments rather than having to be pre-calculated offline. Distance fields can be stored in a channel of a texture. To calculate the distance field, information that describes a shape are evaluated and shape segments that define the shape are created. A bounding box is created for each segment. For each pixel in each bounding box, the distance to the segment is calculated to create segment distance fields. For segments modeled with straight lines and quadratic segments, closed form solutions that can be implemented in the GPU are used. The individual segment distance fields are combined to form an (Continued)

overall shape distance field. A signed distance field is created by determining the inside and outside of the shape and adjusting distance field values appropriately.

20 Claims, 14 Drawing Sheets

(56) References Cited

U.S. PATENT DOCUMENTS

| | | |
|---|---|---|
| 2012/0249569 A1 | 10/2012 | Kokojima |
| 2012/0262493 A1* | 10/2012 | Tsai ...................... G06T 15/005 |
| | | 345/667 |
| 2017/0039739 A1* | 2/2017 | Doran ...................... G06T 1/20 |
| 2019/0236820 A1* | 8/2019 | Lengyel ................ G06T 11/203 |

OTHER PUBLICATIONS

"International Search Report and Written Opinion Issued in PCT Application No. PCT/US19/063825", dated Mar. 13, 2020, 10 Pages.

* cited by examiner

GPU CALCULATION OF SIGNED DISTANCE FIELDS

FIELD

This application relates generally to calculation of signed distance fields for rendering vector shapes and text. More specifically, the application relates to calculate signed distance fields stored in a texture using a Graphics Processing Unit so that crisp vector shapes and text can be rendered at any resolution.

BACKGROUND

Techniques have been developed to accurately render vector graphics using texture-mapping graphics hardware. More recently, signed distance fields can be generated from a high-resolution image and stored in a channel of a lower resolution texture. The signed distance field information in the lower resolution texture can then be used to render accurate and crisp vector graphics at any resolution. However, calculating the signed distance field is usually performed by using an exhaustive "brute force" search methods. Thus, the applicability of textures to render high resolution vector graphics has been limited to environments where a signed distance field for a pre-known shape can be pre-computed (e.g., not computed during run time) and then later used during run time.

It is within this context that the present embodiments arise.

DETAILED DESCRIPTION

Figure 1:
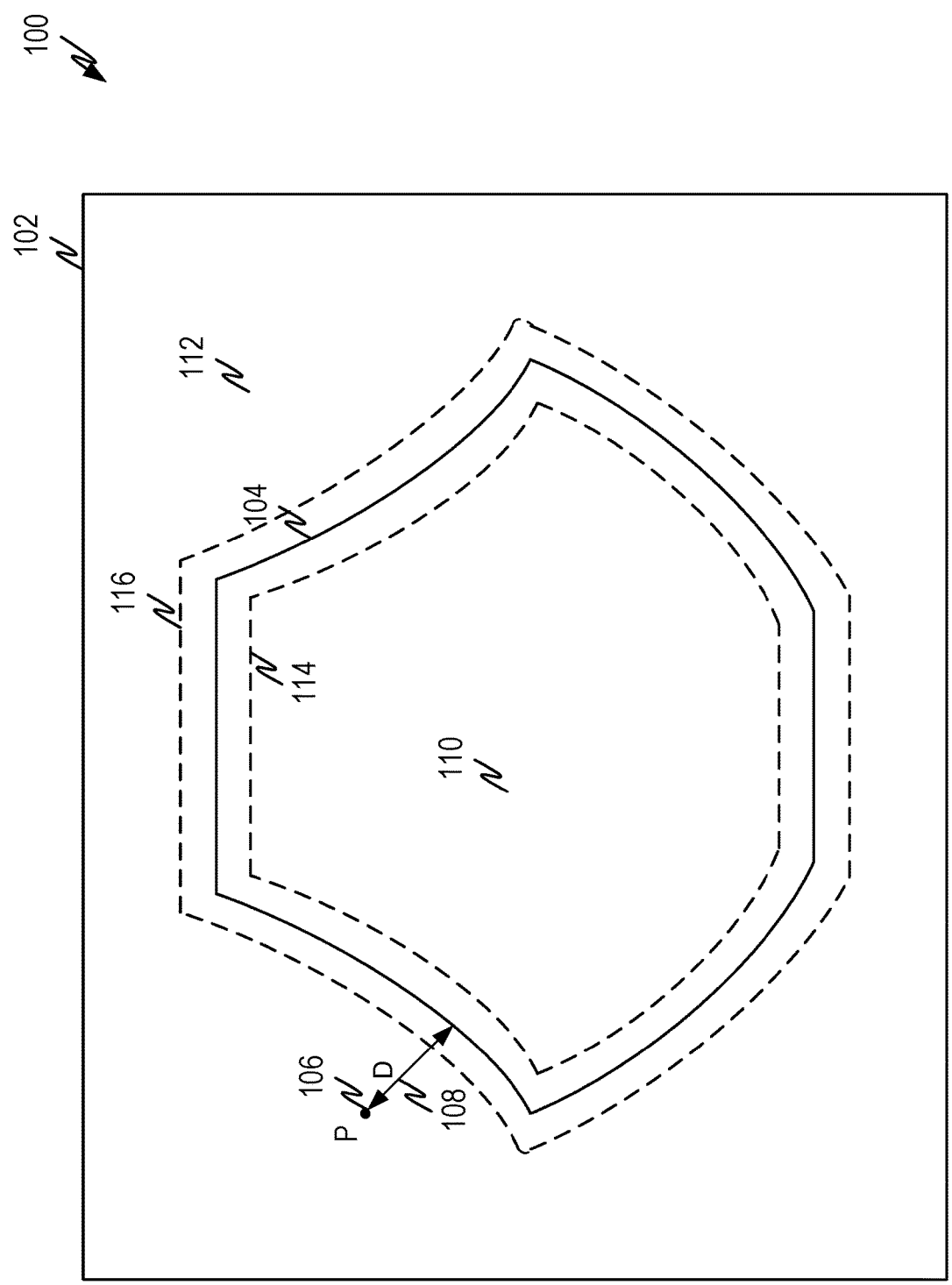
FIG. 1 illustrates an example of a signed distance field.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Historically, vector graphics were rendered using the CPU. This doesn't scale today with complex documents, 4K/5K monitors, and user's expectations of high performance, smooth operation, and clarity when rendering objects. To address these shortcomings and to meet user expectations as well as scale to today's high-resolution monitors, most applications are caching vector graphics into images, which can be redrawn with a high framerate. However, these images use a lot of memory, or quickly look blurry/pixelated when viewed at higher zoom levels. Other hardware accelerated technique for vector shape rendering still require expensive CPU processing for tessellation or intersection calculation.

Signed distance fields are used in the video game industry, they provide a way to cache vector shapes into textures and redraw them with crisp edges at any size, but these distance fields are usually pre-generated by a brute force approach before runtime and added as assets for the games to use during runtime.

Embodiments of the present disclosure allow calculation of a distance field (signed and/or unsigned) using a Graphics Processing Unit (GPU) while minimizing any usage of the CPU. These embodiments use no tessellation, no calculation of intersections, and no image processing. The use of a GPU allows calculation of the distance field for arbitrary shapes in without the exhaustive, brute-force search methods used in the prior art. This allows the distance fields to be calculated during runtime instead of prior to runtime as before. While prior art use of distance fields to produce vector shapes was limited to pre-known shapes whose distance fields could be calculated off line using brute-force methods, embodiments of the present disclosure open up entirely new applications of the use of distance fields to calculate high-resolution, accurate vector shapes during runtime. Thus, shapes that are known or produced only at runtime can now be rendered using distance fields through the disclosed embodiments.

Currently, graphic Application Program Interfaces (APIs) are unable to provide the right performance so that as users zoom and manipulate objects during run time, the system responds in a smooth manner, rendering the objects in a clear, high-resolution manner without any blurry edges. As display technology progresses in resolution, the problem of fuzzy/blurry edges and smooth performance become even more problematic. The embodiments disclosed herein may be incorporated in such APIs to provide the desired smooth, high-resolution performance that scales well as display technology continues to increase in pixel density and display size. Furthermore, the use of GPU to perform the calculations allows faster creation of signed distance fields without drawing on the CPU and impacting program performance.

The signed distance fields can be generated from a high-resolution image are produced in the GPU and stored in a channel of a lower resolution texture. The resolution of the texture is selected to minimize any rendering artifacts at expected zoom levels. The resolution of the texture is defined as the number of pixels in the texture. The resolution of the texture is defined as the number of bits per pixel (e.g., the bit depth of the pixels in the texture).

Since textures have more than one channel (e.g., one channel each for the red, green, and blue information of the texture) additional information can be stored in the other channels of the texture. For example, a first channel can be used to store the signed distance field as described above. A second channel can be used to store an unsigned distance field. A third channel can be used to store information about shape properties such as fill properties and/or line properties (width, dash size, join type, etc.). The texture can then be used to create high-resolution graphics as is known by those of skill in the art.

To create the signed distance field, information describing the shape is identified. The shape is broken up into segments, modeled, for example, using straight segments or quadratic curve segments. A bounding box of a selected shape is placed around each segment in a texture and a distance field created in each bounding box. The individual distance fields within the texture are joined to create an overall shape distance field. A signed distance field is created by identifying pixels "inside" the shape and pixels "outside" the shape according to methods described below. The distance values for inside and/or outside pixels are adjusted to distinguish between inside and outside pixels. The signed distance field is stored in a channel of the texture, possibly along with other information in the other texture channels as described.

The texture is then used to generate a high-resolution representation of the shape as needed.

Description

FIG. 1 illustrates an example 100 of a signed distance field. The signed distance field is stored in a channel of a lower resolution texture 102. The resolution of the texture 102 is defined as the number of pixels in the texture. Thus, a texture 102 may be something like 64×64 or 256×256 or some other resolution. The resolution of the texture can be lower than the display resolution and it will not affect the sharpness of the shape. However, if the resolution is too low, some details may be lost, corners may appear eroded, and there could be some rendering artifacts on thin portions of the shape and/or thin outlines. The resolution also impacts memory usage so available memory may also impact the selected texture resolution.

The range of distance the distance field is set by the bit depth of the texture field. This sets the minimum and maximum distance values that are stored by the texture. As described below, the minimum and maximum distance values determine how far away from the boundary the distance field can get before the value is set to the minimum or maximum value. If the texture depth is low, such as 8 bits (256 values), the range of the distance field can be limited to the line width, or a bit more. However, if the texture depth has sufficient precision, the distance gradient can cover the whole texture. This enables rendering of the shape with any line width without recalculating the distance field. Thus, the texture depth should be selected with these factors in mind.

The distance field stores the distance value D 108 for every pixel in the texture (assuming sufficient depth) from the pixel P 106 to the boundary 104 that defines the shape. In a signed distance field, the distance values on the outside 112 of the boundary 104 are typically indicated by a value of a particular sign (positive or negative) and distance values on the inside 110 of the boundary 104 are indicated by a value of the opposite sign (negative or positive). However other conventions can be used such as values in a first range (0.5 to 1.0, for example) indicating outside the boundary and values in a second range (0 to 0.5, for example) indicating inside the boundary. Thus, when the disclosure talks about changing the sign of a value to indicate it is inside (or outside) the boundary, those of skill in the art will understand that such may be accomplished equivalently in some other fashion such as shifting a value into the appropriate range.

In the figure, dashed lines 114 and 116 show points that have a constant value to the boundary of the shape 104 on the inside of the shape 104 and outside of the shape 116, respectively. These lines are referred to as iso-distance curves in this disclosure.

Figure 2:
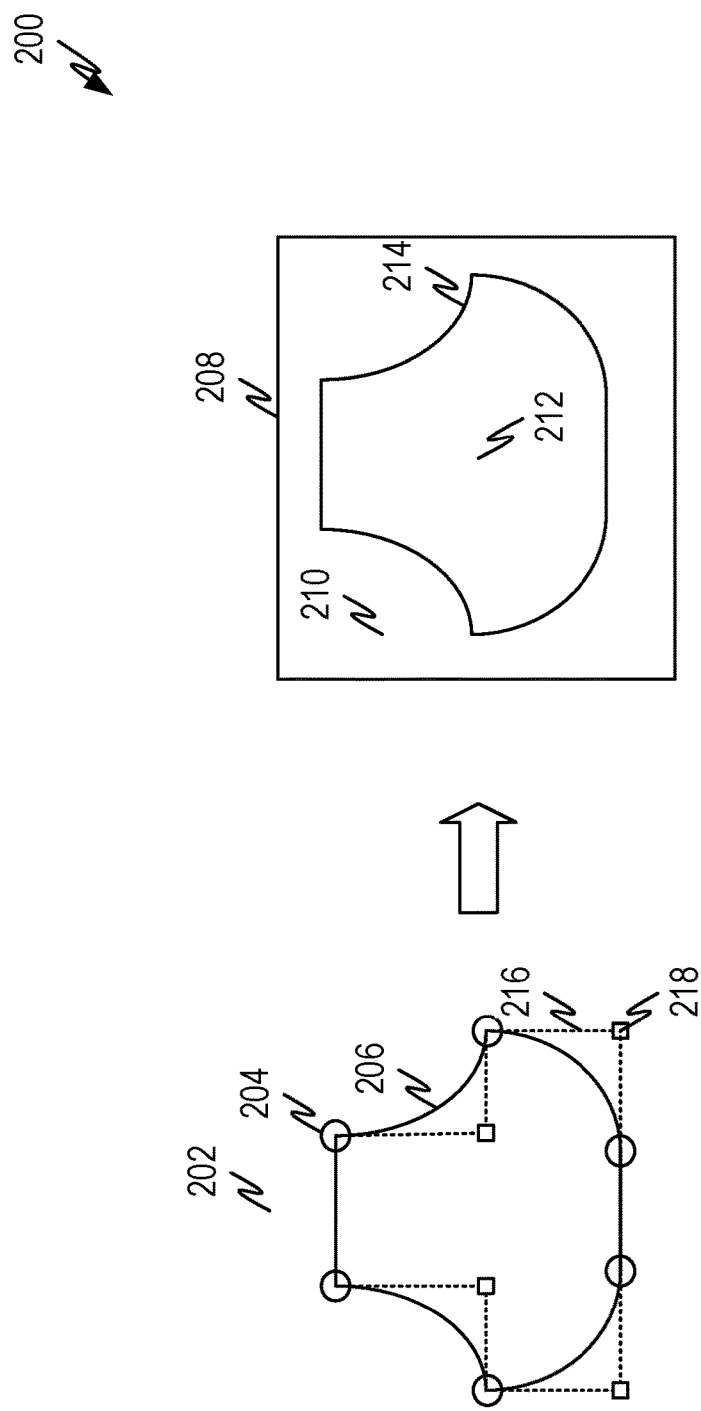
FIG. 2 illustrates a representative example of converting a sequence of points that defines a shape to a signed distance field according to some aspects of the present disclosure.

FIG. 2 illustrates a representative example 200 of converting a sequence of points that defines a shape to a signed distance field according to some aspects of the present disclosure. At a high level, embodiments of the present disclosure take information that describes a shape 202 and converts the information to a texture 208 storing a distance field. The resultant texture contains all necessary information to draw a complex shape with outline, dashes, fill, and/or compound likes in a single pass fragment shader by looking at the value of the distance field and/or other information for each pixel stored in the channels of the texture 208.

The information used to describe the shape 202 can be any type of information that accurately describes the shape and that can be processed by an appropriate processor, such as a GPU. For example a shape can be defined by a list of points 204 connected by segments 206. In this disclosure, embodiments that use straight segments and/or quadratic segments are discussed. However, any shape of segment can be used as long as an appropriate distance calculation can be made as discussed below. However, in most instances, straight segments and quadratic segments will suffice.

Other mechanisms to define a shape can also be used. For example, a high-resolution image can be used to define a shape. The high-resolution image can be used directly or converted into a collection of segments (straight and/or quadratic) to represent the image. The advantage of converting the image into a representation described by straight and/or quadratic segments is that the distance calculations can be performed directly without the need to resort to other methods to determine the distance to the shape boundary.

Figure 3:
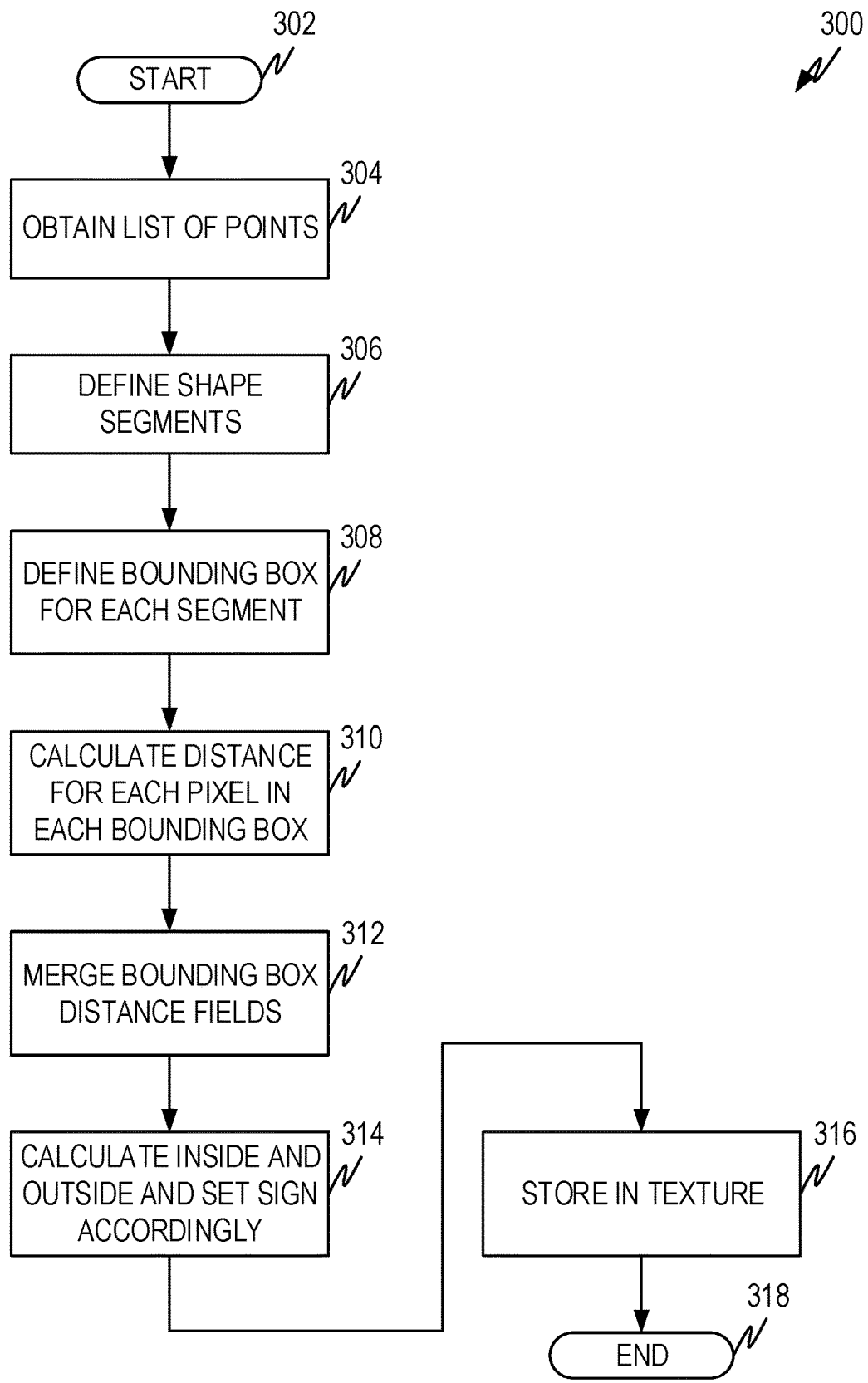
FIG. 3 illustrates a representative flow diagram for converting information that defines a shape to a distance field according to some aspects of the present disclosure.

FIG. 3 illustrates a representative flow diagram 300 for converting information that defines a shape to a distance field according to some aspects of the present disclosure. The flow diagram presents the operations that are discussed in greater detail in subsequent figures.

The flow diagram begins at operation 302 and proceeds to operation 304 where the information that describes the shape (such as a list of points that define segments, a high-resolution version of the shape, or so forth) are obtained. As discussed above, the information can be a list of points that define appropriately shaped segments, an image, or other information that appropriately defines the shape.

In operation 306 the shape is placed in the texture and broken up into appropriate segments that together make up the shape. This operation is discussed in greater detail in conjunction with FIG. 4 below.

In operation 308 a bounding box of a selected shape is created around each segment. This is also discussed in greater detail in FIG. 4.

In operation 310 each bounding box is considered in turn, and for each bounding box, each pixel in the bounding box is examined and the distance from the pixel to the boundary of the shape as represented by the segment in the bounding box is calculated. Calculation of the distance values is discussed in conjunction with FIGS. 5 and 6 below. The result is a distance field for the segment in the bounding box, sometimes referred to herein as a bounding box distance field.

In operation 312 the bounding box distance fields are merged into a distance field for the entire shape. This involves selecting the appropriate distance value for each pixel in the texture. This represents the shape distance field and has the resolution that is stored in the texture. Merging distance fields is discussed in conjunction with FIGS. 7 and 8 below.

After operation 312 an unsigned distance field corresponding to the shape has been calculated. The unsigned distance field can be stored in a channel of the texture as shown in operation 316 and as discussed below.

Operation 314 calculates the inside and outside of the figure and adjusts the sign and/or values of the distance field appropriately to indicate the inside and outside of the shape. Calculation of the inside and outside to turn the distance field into a signed distance field is discussed in conjunction with FIGS. 9-13 below.

Once the signed distance field is calculated, it can be stored in a channel of the texture as shown in operation 316 and as discussed below. The method ends at operation 318.

Figure 4:
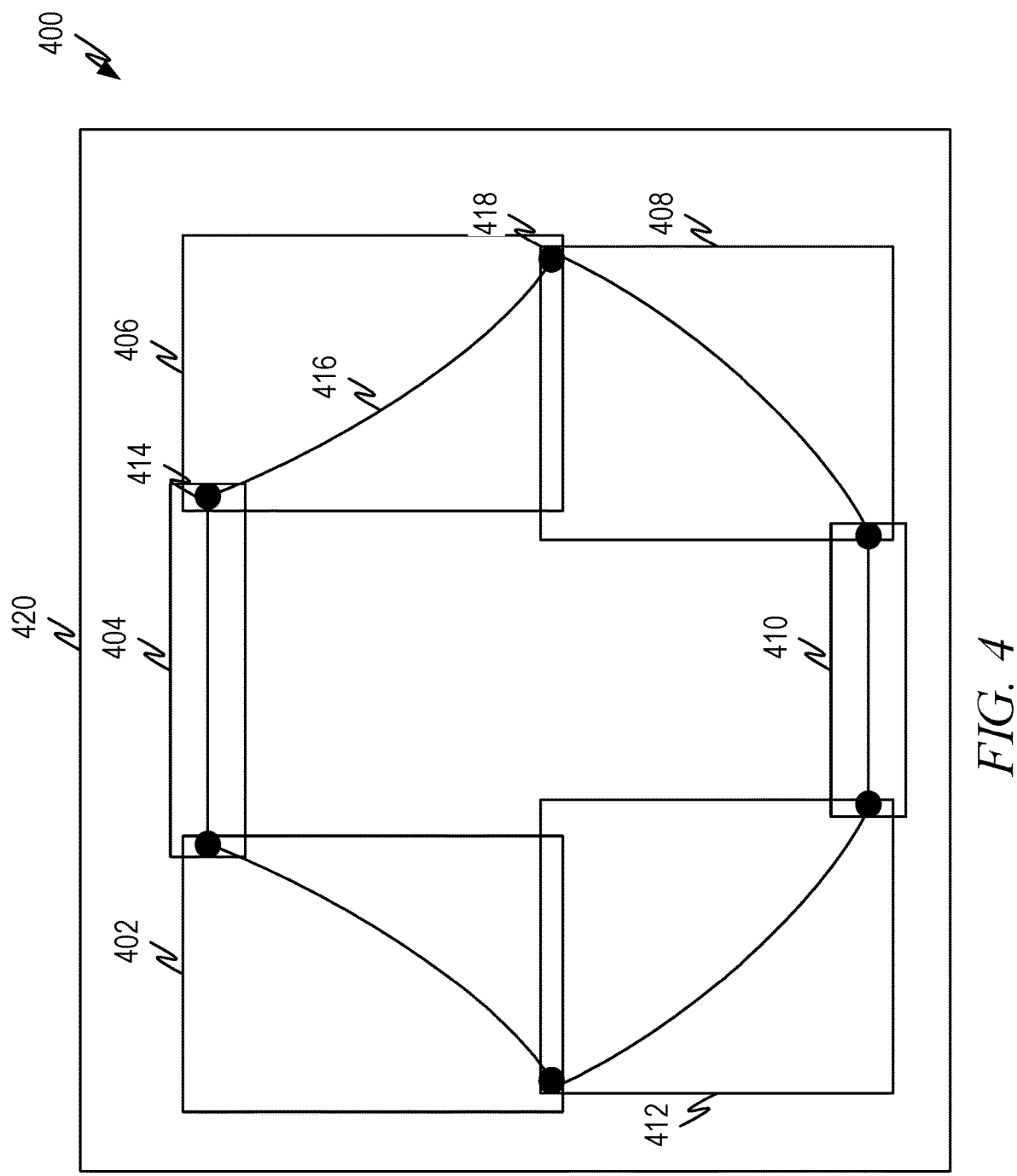
FIG. 4 illustrates a representative example of placing bounding shapes according to some aspects of the present disclosure.

FIG. 4 illustrates a representative example 400 of placing bounding shapes according to some aspects of the present disclosure. As previously discussed, the shape can be described as a list of points e.g., 414, 418 connected by segments e.g., 416. The points that describe the shape can be in a higher resolution space than the resolution of the texture that will be created. Thus, the operations of FIG. 3 (e.g., 306, 308, 310, 312, 314) can be done at the higher resolution shape space and then converted to the lower resolution texture space or the shape can be initially converted to the texture space resolution and all the calculations can be done at the lower texture resolution. The description below describes the latter approach, although those of skill in the art will understand how to implement the first approach from the disclosure herein.

Operation 306 defines the shape segments. To divide the shape into segments and place bounding boxes around the segments, the list of points e.g., 414, 418 along with their defined segments e.g., 416 are mapped from the shape to a corresponding location within the resolution of the texture. This places the points that define the shape within the resolution of the texture 420 that will be used to store the distance field.

The shape of the bounding box around a segment can be any shape that encloses the segment. Experiments have been performed with shapes that minimize the area around the segment and rectangular bounding boxes. While there is a tradeoff between complexity of implementation, the number of pixels processed in "looser" rectangular bounding boxes and the processing necessary to create "tighter" non-rectangular bounding boxes, either will work and many implementations may opt for the rectangular bounding boxes. The minimum size of the bounding box, whatever shape it may be, needs to enclose the shape and have sufficient space to miter the corners of the segments if that type of join is used (see below). Any bounding box larger than the minimum size will work for a given segment.

The segments are easily defined by the list of points e.g., 414, 418 and a shape of the line between the points. The shape of the line can be any shape, although straight segments and quadratic segments are discussed herein. If straight and/or quadratic segments are selected as the basis for the calculations herein, additional points may be added to the shape so that the selected segments approximate the shape well. For example, of the line 416 between points 414 and 418 is not well represented by a straight segment or quadratic segment, then the segment 416 may be divided into further segments that can be represented by a combination of straight and/or quadratic segments. Curve fitting techniques and error calculations to determine the accuracy of the representation are well known and need not be repeated here.

Once the shape and segments are identified, operation 308 places a bounding box around each segment. In FIG. 4 this is illustrated by bounding boxes 402, 404, 406, 408, 410, and 412.

Figure 5:
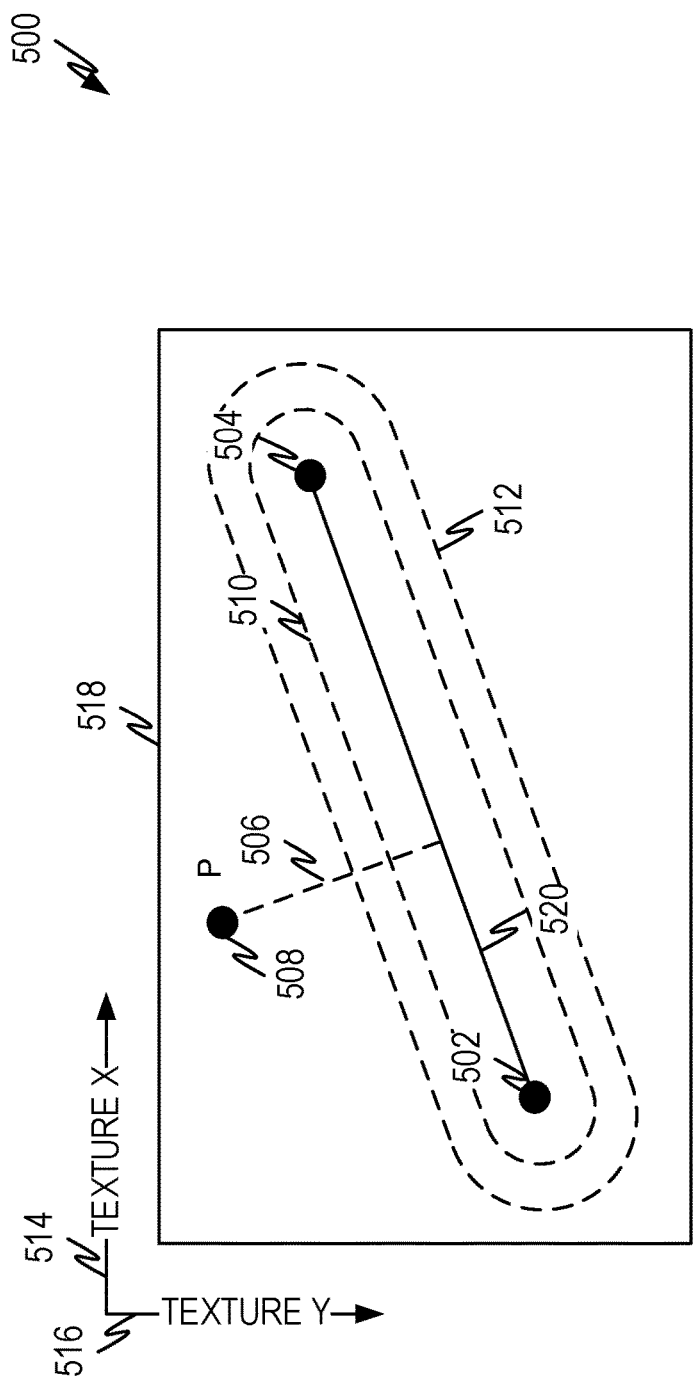
FIG. 5 illustrates a representative example of calculating the distance to a straight segment according to some aspects of the present disclosure.

Operation 310 calculates a distance measure for each pixel in each of the bounding boxes. FIG. 5 illustrates a representative example 500 of calculating the distance to a straight segment according to some aspects of the present disclosure.

In FIG. 5, a straight segment 520 defined by the two endpoints 502, 504 is enclosed within a bounding box 518. The distance value of a pixel, P 508 within the bounding box 518 is calculated by finding a orthogonal projection 506 of the pixel P 508 onto the line defined by points 502 and 504. If the projection falls on the straight segment 520 (i.e., between the endpoints 502 and 504), then the distance is the length of the orthogonal projection. Otherwise, it is the distance to either endpoint 502 or endpoint 504, whichever is closer. The iso-distance curves shown by dashed lines 510 and 512 give a visual display of curves that have the same distance value for all pixels along their respective curves.

Because an orthogonal projection to the line defined by points 502 and 504 is made for all pixels in the bounding box, it may be desirable to transform the coordinates of the pixels in the bounding box from a coordinate space defined by the bounding box, illustrated as texture X 514 and texture Y 516, to a coordinate system that is aligned with the line defined by points 502, 504. In other words, the resulting coordinate system has one axis tangential to the straight segment 520 and one axis orthogonal to straight segment 520. Such a transformation can simplify the distance value calculations.

Figure 6:
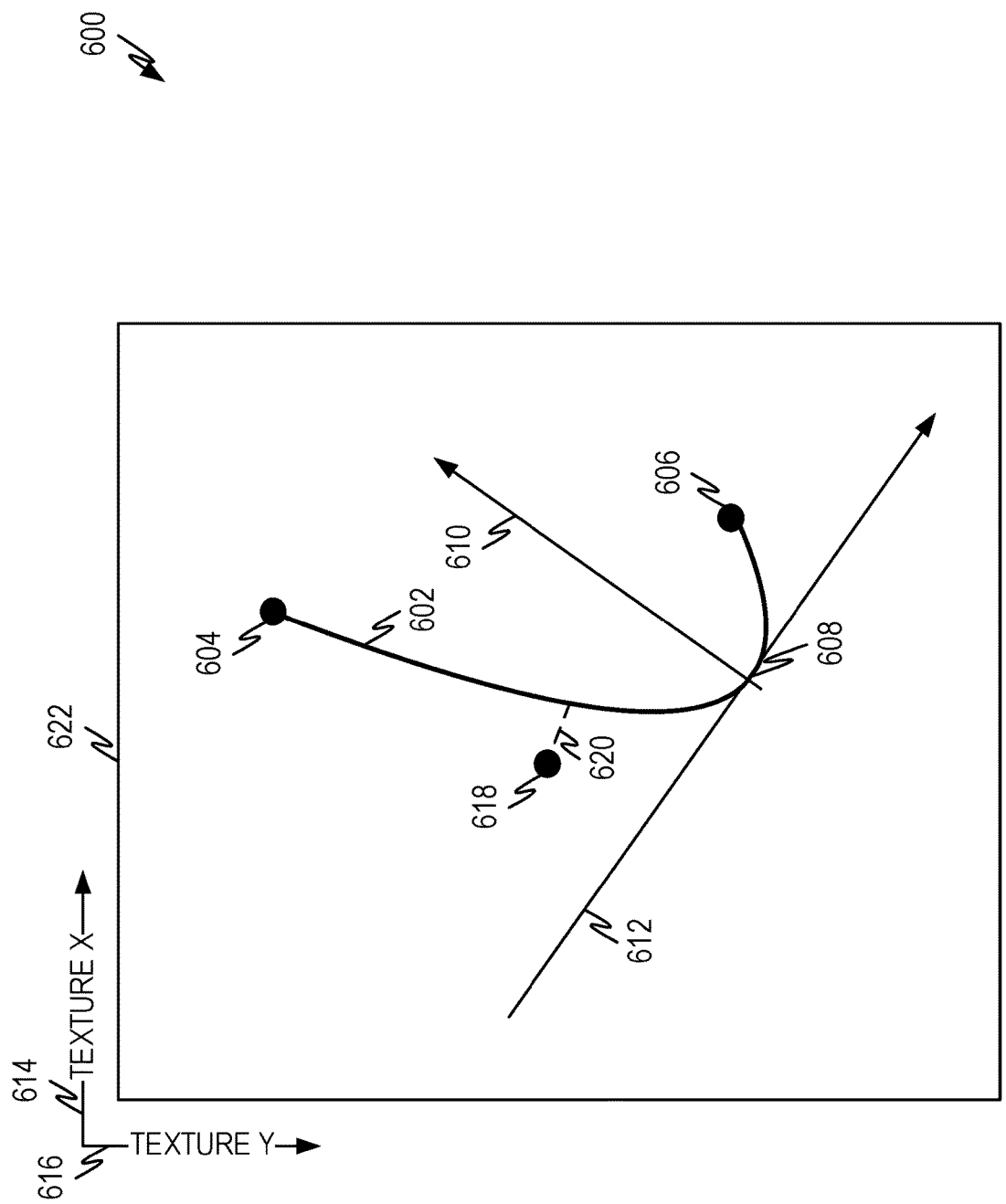
FIG. 6 illustrates a representative example of calculating the distance to a quadratic segment according to some aspects of the present disclosure.

FIG. 6 illustrates a representative example 600 of calculating the distance to a quadratic curve segment 602 according to some aspects of the present disclosure. In the example 600, the quadratic curve segment 602 is defined by a parabola: $y=x^2$. Although any quadratic curve can be used in embodiments of the present disclosure, often a parabola is sufficient to model curves of a shape.

To make the calculations easier, the coordinates of a pixel 610 are transformed by the coordinate system given by texture X 614 and texture Y 616 to a coordinate system centered on the zero point 608 of the parabola containing the quadratic segment 602. The new coordinate system is illustrated by the x-axis 612 and the y-axis 610.

The distance to a pixel 618 having a coordinate of (Px, Py) is given by the following equations. There are also alternative formulations.

The distance 620 between the pixel at (Px, Py) and the closest point on the parabola (x, $x^2$) is referred to as d and is given by:

$$d = \sqrt{\Delta x^2 + \Delta y^2} \quad (1)$$

Where d is the distance field value and $\Delta x = (x-Px)$ and $\Delta y = (x^2-Py)$.

The solution for the point on the curve (x, $x^2$) that is closest to (Px, Py) is given by solving the equation:

$$x^3 + \frac{1}{2}(1-2Py)x - \frac{Px}{2} = 0 \quad (2)$$

There are several formulations to solving this equation and are known in the art. One formulation can be stated as follows, although any formulation adaptable for implementation on a GPU can be used. Let:

$$a = \frac{1}{2}(1-2Py) \quad (3)$$

$$b = -\frac{Px}{2} \quad (4)$$

Then, if:

$$\frac{b^2}{4} + \frac{a^3}{27} > 0 \quad (5)$$

There is a single real root and the following formulation is used. Let:

$$A = \sqrt[3]{-\frac{b}{2} + \sqrt{\frac{b^2}{4} + \frac{a^3}{27}}} \quad (6)$$

$$B = -\sqrt[3]{\frac{b}{2} + \sqrt{\frac{b^2}{4} + \frac{a^3}{27}}} \quad (7)$$

Then, the value of x is given by:

$$x_0 = A + B \quad (8)$$

Otherwise, there are three real roots that can be calculated using trigonometric functions. Let:

$$C = \frac{1}{3}\cos^{-1}\left(\frac{3b}{2a}\sqrt{\frac{-3}{a}}\right) \quad (9)$$

And the three roots are given by:

$$x_k = 2\sqrt{-\frac{a}{3}} \cos\left(C - \frac{2\pi k}{3}\right) \quad (10)$$

Where k takes on the values of 0, 1, and 2 to produce the real roots.

When there are multiple real value candidates for x, the one that yields the shortest distance according to equation (1) is selected. Additionally, only values of (x, $x^2$) that lie between the endpoints 604 and 606 are calculated according to the equations. This corresponds to an orthogonal projection from the pixel 618 that connects to the quadratic segment 602. For orthogonal projections that are outside the endpoints, the distance is given by the distance from the pixel 618 to either endpoint 604 or endpoint 606, whichever is shorter.

Figure 7:
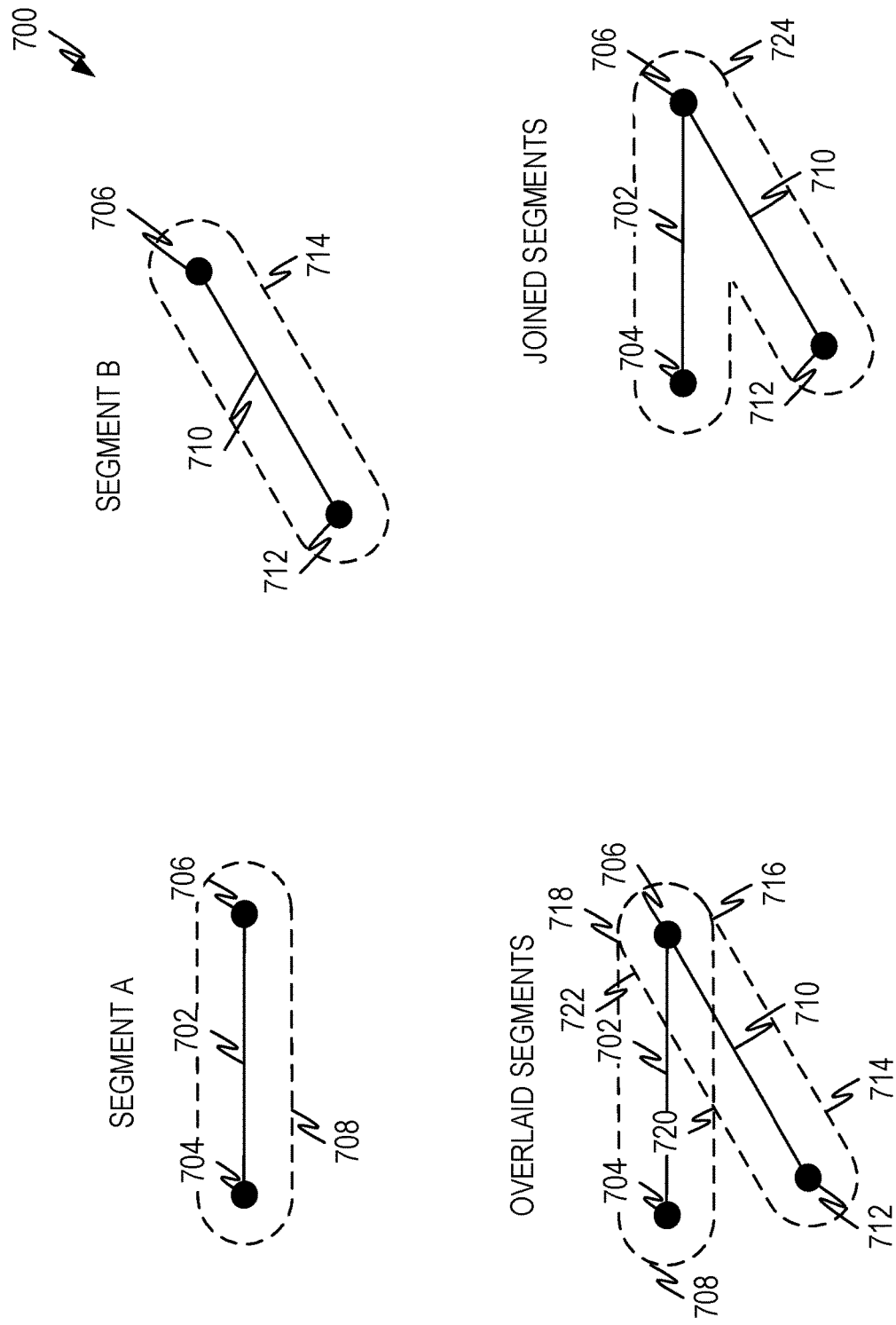
FIG. 7 illustrates a representative example of combining segments according to some aspects of the present disclosure.

Once the distance fields for each of the bounding boxes (sometimes referred to herein as a bounding box distance field) are calculated, the distance fields are merged to create the distance field for the overall shape as indicated in operation 312. This entails merging distance fields from two segments. FIG. 7 illustrates a representative example 700 of combining segments according to some aspects of the present disclosure. The example 700 shows two segments of a shape. The first segment is segment A 702 which is defined by endpoints 704 and 706. The second segment is segment B 710 defined by endpoints 706 and 712. When joining the two segments, the distance field of the combined segments should contain the minimal distance to the closest segment. This is referred to herein as min blending or min joining.

For this example, an iso-distance curve is shown 708 and 714 for segment A 702 and segment B 710, respectively. These curves represent a constant distance to their respective segments and also contain the same distance values. In other words, curve 710 and 714 are the same distance value. If the segments are overlaid, the iso-distance curves in the figure indicates how the distance values of the various pixels relate to each other.

When segments 702 and 710 are joined at common point 706, iso-distance curves 708 and 714 have common valus at three common points, labeled 716, 718 and 720. If we assume that distance values are assigned so that pixels closer to a segment have a lower distance value, then at the pixel illustrated at 722, the distance value in the distance field for segment 702 will be lower than the distance value in the corresponding pixel for segment 710. Thus, taking the minimum distance value for the two pixels, will yield the goal of having the pixels contain the minimum distance to the closest segment. Taking the minimum of such overlapped pixels, will yield the result in the joined segments diagram. The corresponding iso-distance curve is illustrated by 724.

Depending on how the distance is encoded, the maximum rather than the minimum distance value can be used in some embodiments, as will be apparent to those of skill in the art from the above disclosure.

Figure 8:
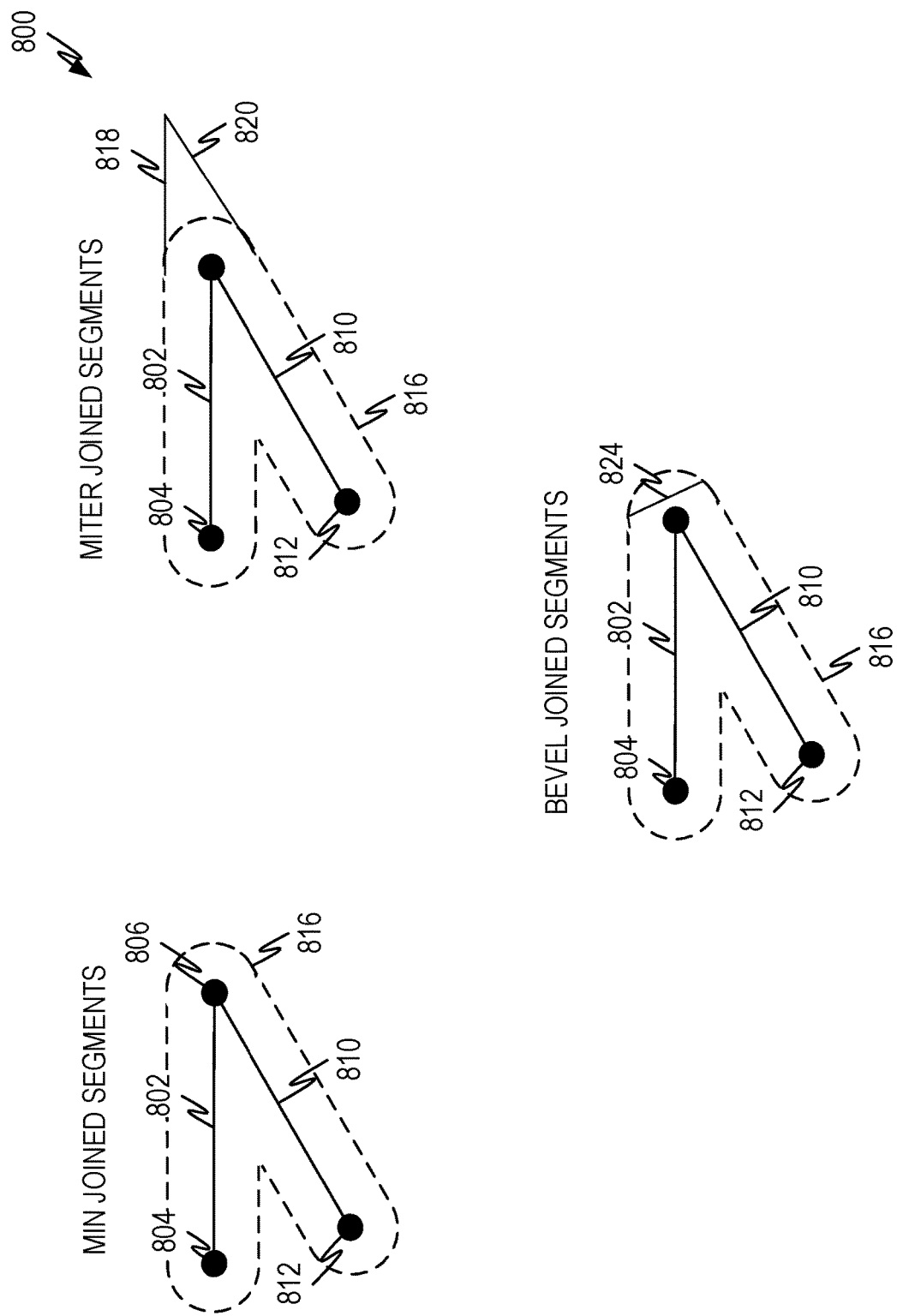
FIG. 8 illustrates a representative example of combining segments according to some aspects of the present disclosure.

FIG. 8 illustrates a representative example 800 of combining segments according to some aspects of the present disclosure. Joining fields using a min join as described above results in rounded iso-distance curves in the distance fields. This was shown in FIG. 7 and is also illustrated in FIG. 8 where joined segments 801 and 810 have the resulting iso-distance curve 816 with a rounded shape where the two segments join. However, as is known in the art, when lines that have a width are joined, sometimes it is desired to have them miter joined or bevel joined. The concept of miter joining or bevel joining can also be applied to segments of a shape. To get miter or bevel joins, the end of the segments can be clipped and replaced by linear gradients with the appropriate slope. This has the effect on the distance gradient that is illustrated on FIG. 8.

For miter joined segments, the iso-distance curve 816 will have the shape illustrated where the end is pointed, by extending the iso-distance curve by 818 and 820. For bevel joined segments, the end of the segments are clipped resulting in the shape illustrated by 824.

Operation 314 identifies the inside and outside of the shape and sets the distance field to the appropriate sign or adjusts the values appropriately to make sure that the distance field is signed. The following figures discuss mechanisms to identify inside and outside so that the inside can be appropriately distinguished from the outside of the shape. In the examples below, the inside is distinguished by a fill pattern (or notation of which regions are filled) and the outside is distinguished by no fill. However, this is simply a convenient way to visually represent inside and outside. The signed distance field values and/or sign distinguish inside from outside as described herein.

Figure 9:
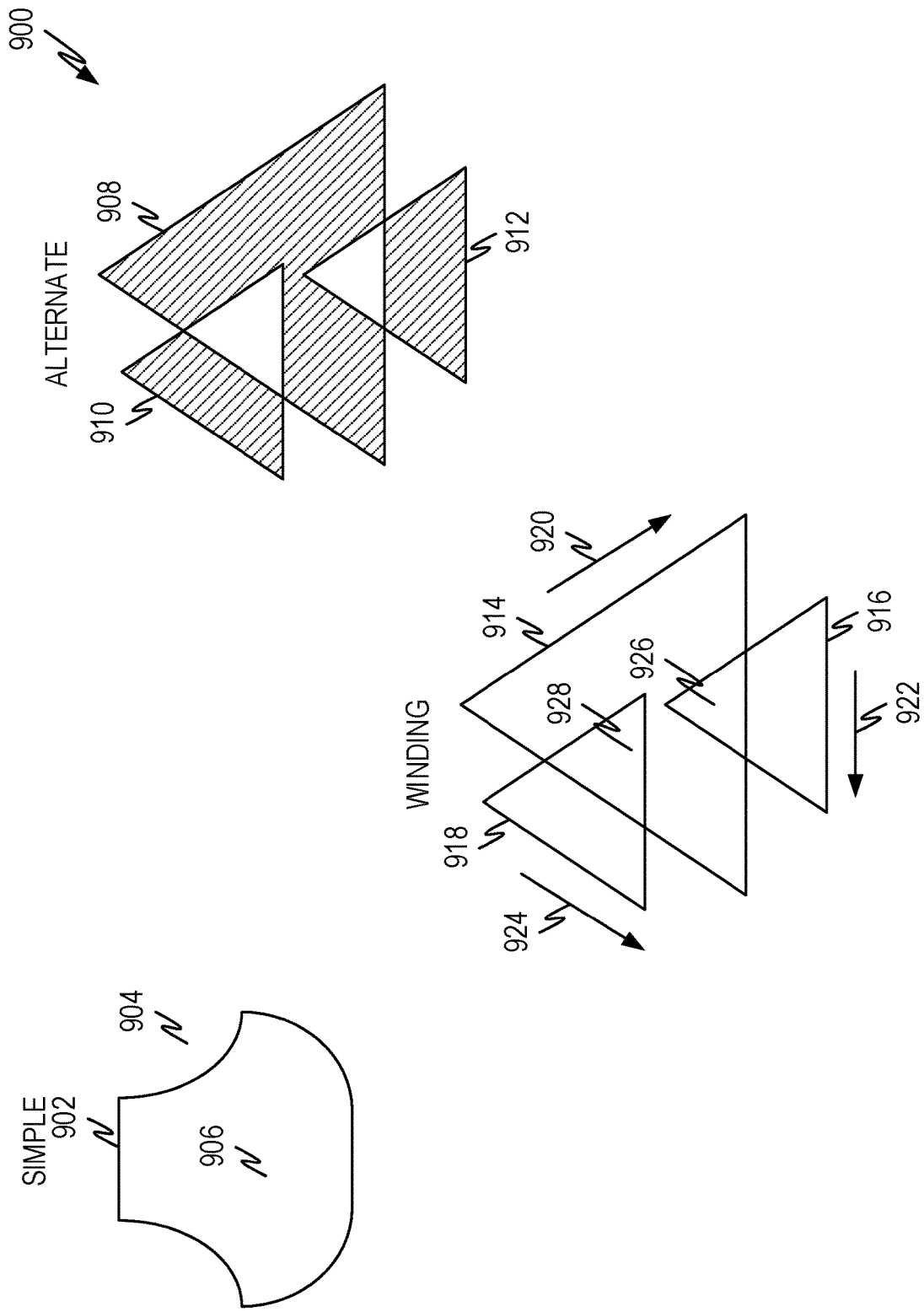
FIG. 9 illustrates representative examples of switching signs of the interior of shapes according to some aspects of the present disclosure.

FIG. 9 illustrates representative examples 900 of switching signs of the interior of shapes according to some aspects of the present disclosure. Conceptually, when a shape comprises a simple closed shape, it is easy to discern the inside from the outside. Thus, shape 902 has an outside 904 and an inside 906. When a signed distance field is created the inside and outside have different signs or ranges as previously described.

When the shape comprises multiple overlapping shapes, or when a shape self-overlaps, the concept of "inside" and "outside" are more complicated. The examples presented herein use different overlapping shapes, but when a shape self-overlaps (e.g., the boundary of a single shape crosses itself creating multiple overlapping regions) the same logic applies. One approach that is taken is referred to as "alternate." In this approach, the number of shapes that overlap alternate inside and outside. Thus, a shape comprising three triangular shapes, 908, 910, and 912 that overlap as illustrated have "inside" where an odd number of shapes overlap (shown by the shaded areas) and "outside" where an even number of shapes overlap (non-shaded areas) even though these overlapping "outside" areas are within the perimeter of the aggregate shapes 908, 910, and 912.

An alternative approach uses the "clockwiseness" of the shape to identify "inside" or "outside." This approach is referred to herein as "winding." Two shapes that overlap and have the same clockwiseness do not change the area of overlap from inside to outside. Two shapes that overlap and that have different clockwiseness do change the area of overlap from inside to outside. Such an approach is usually required for rendering text.

In FIG. 9, the triangle 914 has a clockwise direction as indicated by arrow 920. Thus, when rendering this shape, it can be extruded in a clockwise direction. The triangle 916 also has a clockwise direction as indicated by arrow 922. Thus, the overlap area 926 between them would not be "outside." On the other hand, the triangle 918 has an anticlockwise also referred to as counterclockwise direction as indicated by arrow 924. Thus, the area of overlap 928 would be considered to be outside.

Several methods for determining "inside" and "outside" for both simple and overlapping shapes either in an alternate mode or winding mode can be developed and any of these can be used in embodiments herein. However, what is described below represents a method that will work for simple or overlapping shapes, in either alternate mode or winding mode and has the advantage of using a single method for all modes of operation and being capable of being implemented in a GPU in an efficient manner. The method is based on dividing regions based on direction of travel and length of segment. It works for both linear and quadratic segments.

Figure 10:
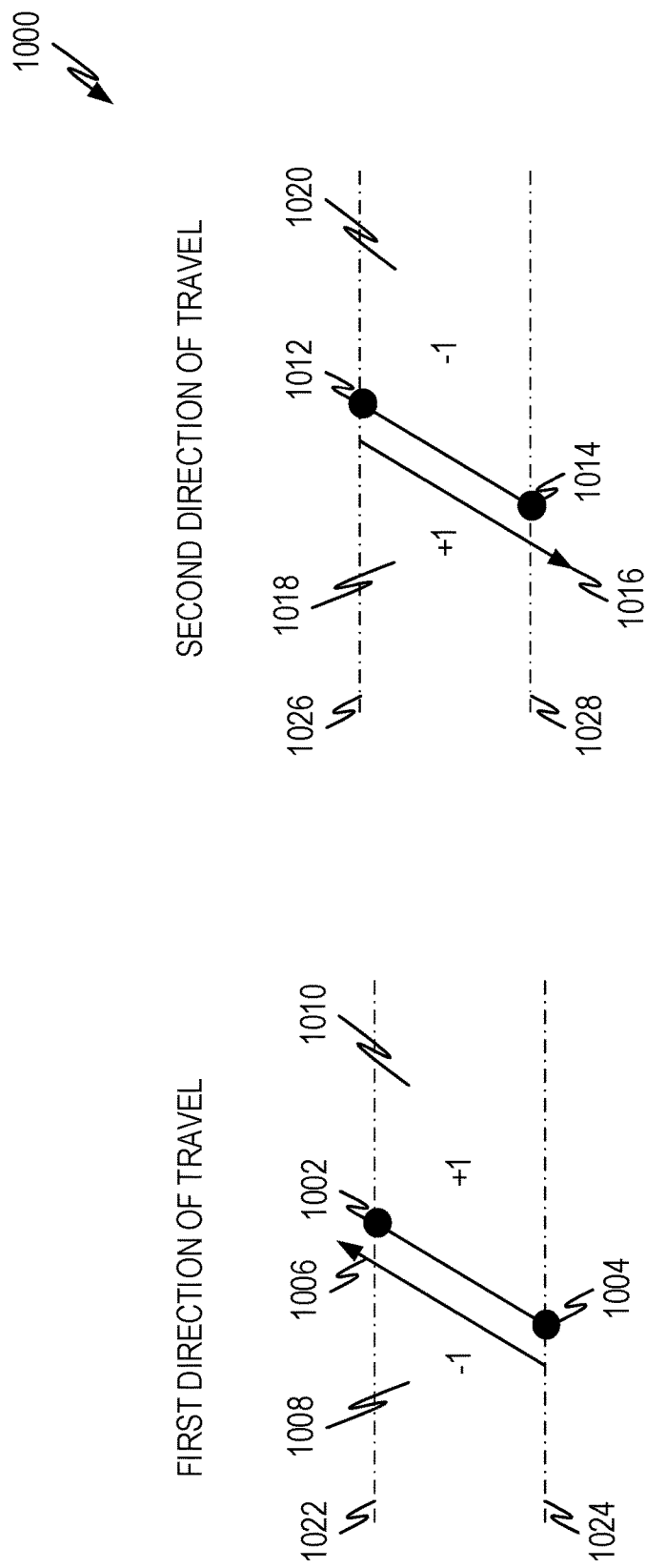
FIG. 10 illustrates a representative example of sign based on the direction of travel for a segment according to some aspects of the present disclosure.

FIG. 10 illustrates a representative example 1000 of sign based on the direction of travel for a segment according to some aspects of the present disclosure. For straight segments, when the direction of travel is not horizontal, the region to one side is incremented and the region to the other side is decremented. In the examples discussed herein, the convention is to increment on the right of the direction of travel and decrement on the left of the direction of travel.

In the first illustrated direction of travel, a straight segment is defined by endpoints 1002 and 1004. The dashed lines 1022 and 1024 show the vertical extent of the regions that are incremented/decremented. If the direction of travel is from point 1004 to 1002 as shown by arrow 1006, everything in the region to the right of the line (shown by 1010) is incremented by one and everything in the region to the left of the line (shown by 1008) is decremented by one.

In the second illustrated direction of travel, a straight segment is defined by endpoints 1012 and 1014. The dashed lines 1026 and 1028 show the vertical extent of the regions that are incremented/decremented. If the direction of travel is from point 1012 to 1014 as shown by arrow 1016, everything in the region to the right of the line (shown by 1018) is incremented by one and everything in the region to the left of the line (shown by 1020) is decremented by one.

For horizontal movement in either direction, no increment or decrement is performed.

Figure 11:
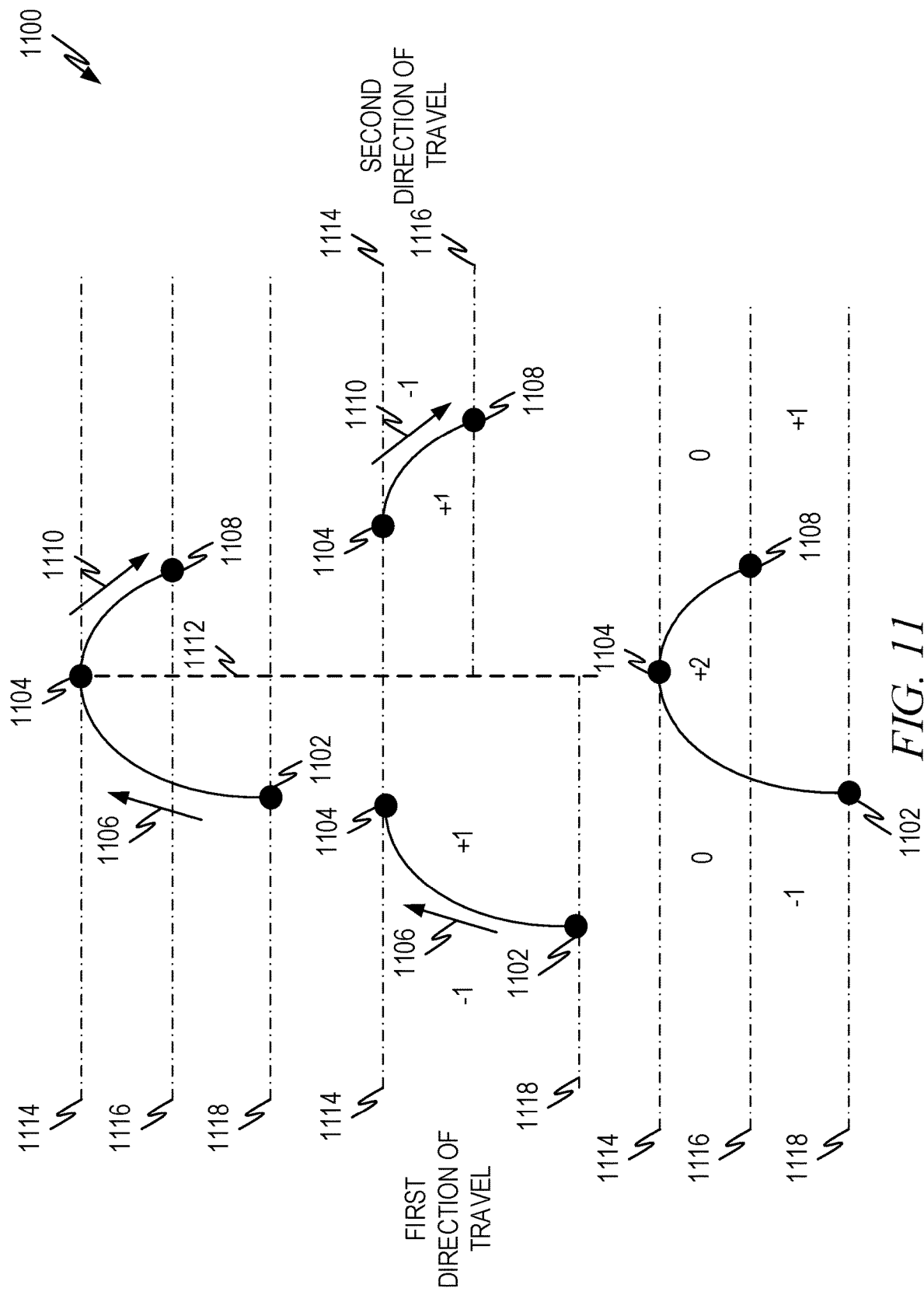
FIG. 11 illustrates a representative example of sign based on the direction of travel for a quadratic segment according to some aspects of the present disclosure.

FIG. 11 illustrates a representative example 1100 of sign based on the direction of travel for a quadratic segment according to some aspects of the present disclosure. A quadratic segment, such as that defined by points 1102 and 1108 at the top of the figure may have an inflection point 1104 where the direction of travel changes. Thus, the quadratic segment is treated as two segments having two different directions of travel. Thus, the quadratic segment is decomposed into two segments split at the inflection point 1104 as shown by divided line 1112. The dashed lines 1114, 1116, and 1118 show the vertical extent of the regions covered.

For the first direction of travel (indicated by arrow 1106) shown on the left in the middle of the FIG., the segment extends from the lower dashed line 1118 to the upper dashed line 1114. Thus, everything on the right of the direction of travel between 1118 and 1114 is incremented by one and everything on the left of the direction of travel between 1118 and 1114 is decremented by one.

For the second direction of travel (indicated by arrow 1110) shown on the right in the middle of the FIG., the segment extends from the lower dashed line 1116 to the upper dashed line 1114. Thus, everything on the right of the direction of travel between 1116 and 1114 is incremented by one and everything on the left of the direction of travel between 1116 and 1114 is decremented by one.

At the bottom of the FIG. the resultant counts are shown in the different regions. Thus, between 1118 and 1116 on the left of the segment the count is −1 and on the right of the segment is +1. Between 1116 and 1114 on the far left of the segment and on the far right of the segment the count is 0. In the middle of the segment the count is +2.

Again, no regions or incrementing is performed for horizontal travel in either direction.

Figure 12:
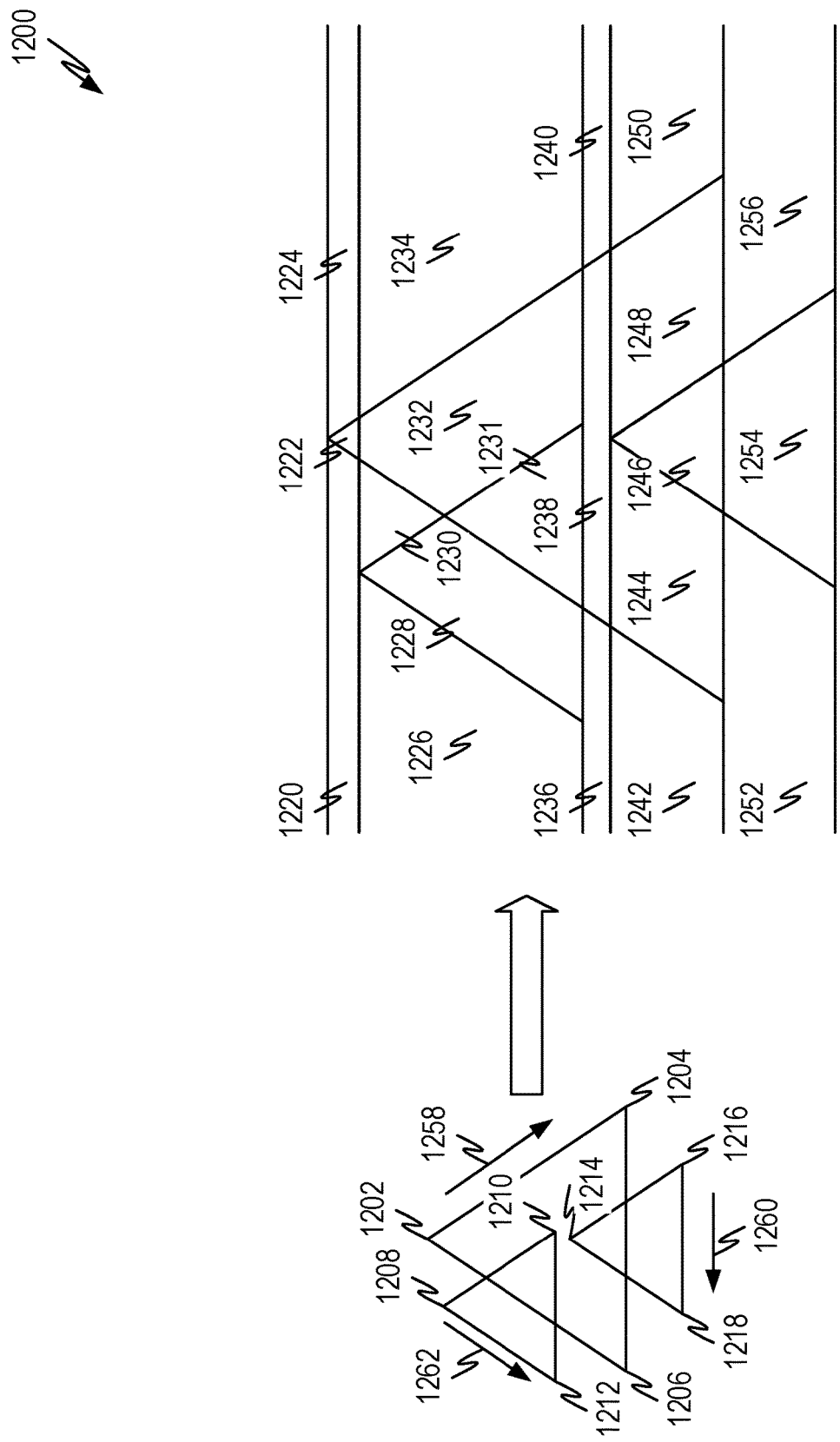
FIG. 12 illustrates a representative example of using sign based on the direction of travel to calculate fill according to some aspects of the present disclosure.

FIG. 12 illustrates a representative example 1200 of using sign based on the direction of travel to calculate fill according to some aspects of the present disclosure. The overall shape is shown on the left. This is a shape consisting of three triangles, one defined by the vertices 1202, 1204, 1206 with a clockwise direction as indicated by arrow 1258. The second triangle is defined by vertices 1208, 1210, and 1212 and has a counterclockwise direction as indicated by arrow 1262. The third triangle is defined by vertices 1214, 1216, and 1218 and has a clockwise direction as indicated by arrow 1260.

On the right illustrates all the regions that are defined by the three triangles. These are numbered 1220 through 1256. Table 1 illustrates the count in each area as the segments from one vertex to another are traversed.

TABLE 1

Cumulative Area Counts

| Area | 1206-1202 | 1202-1204 | 1204-1206 | 1208-1212 | 1212-1210 | 1210-1208 | 1218-1214 | 1214-1216 | 1216-1218 |
|---|---|---|---|---|---|---|---|---|---|
| 1220 | −1 | 0 | 0 | 0 | 0 | 0 | 0 | 0 | 0 |
| 1222 | +1 | +2 | +2 | +2 | +2 | +2 | +2 | +2 | +2 |
| 1224 | +1 | 0 | 0 | 0 | 0 | 0 | 0 | 0 | 0 |
| 1226 | −1 | 0 | 0 | +1 | +1 | 0 | 0 | 0 | 0 |
| 1228 | −1 | 0 | 0 | −1 | −1 | −2 | −2 | −2 | −2 |
| 1230 | −1 | 0 | 0 | −1 | −1 | 0 | 0 | 0 | 0 |
| 1231 | +1 | +2 | +2 | +1 | +1 | 0 | 0 | 0 | 0 |
| 1232 | +1 | +2 | +2 | +1 | +1 | +2 | +2 | +2 | +2 |
| 1234 | +1 | 0 | 0 | −1 | −1 | 0 | 0 | 0 | 0 |
| 1236 | −1 | 0 | 0 | 0 | 0 | 0 | 0 | 0 | 0 |
| 1238 | +1 | +2 | +2 | +2 | +2 | +2 | +2 | +2 | +2 |
| 1240 | +1 | 0 | 0 | 0 | 0 | 0 | 0 | 0 | 0 |
| 1242 | −1 | 0 | 0 | 0 | 0 | 0 | −1 | 0 | 0 |
| 1244 | +1 | +2 | +2 | +2 | +2 | +2 | +1 | +2 | +2 |
| 1246 | +1 | +2 | +2 | +2 | +2 | +2 | +3 | +4 | +4 |
| 1248 | +1 | +2 | +2 | +2 | +2 | +2 | +3 | +2 | +2 |
| 1250 | +1 | 0 | 0 | 0 | 0 | 0 | +1 | 0 | 0 |
| 1252 |   |   |   |   |   |   | −1 | 0 | 0 |
| 1254 |   |   |   |   |   |   | +1 | +2 | +2 |
| 1256 |   |   |   |   |   |   | +1 | 0 | 0 |

Figure 13:
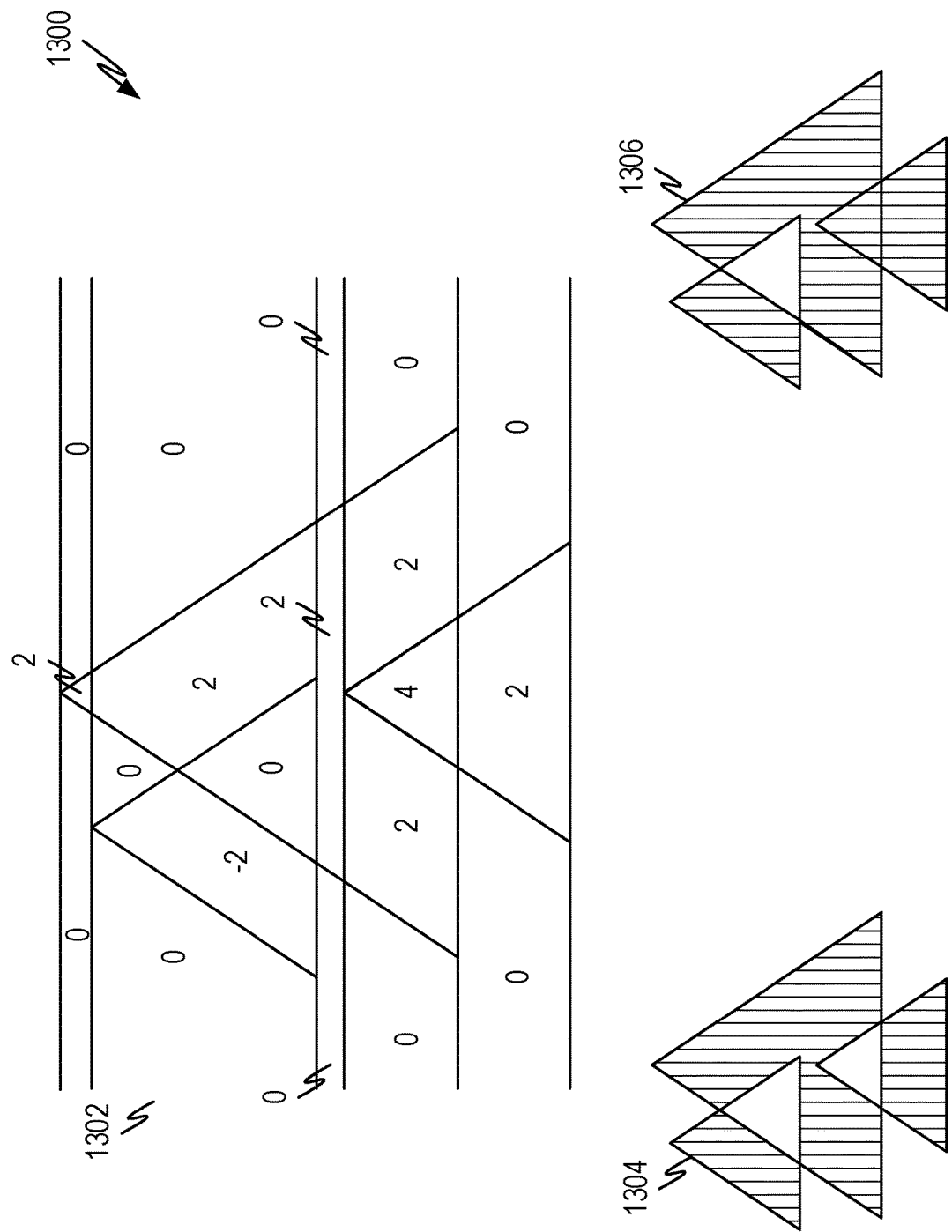
FIG. 13 illustrates a representative example of using sign based on the direction of travel to calculate fill according to some aspects of the present disclosure.

FIG. 13 illustrates a representative example 1300 of using sign based on the direction of travel to calculate fill (inside the shape) according to some aspects of the present disclosure. The top of the FIG. 1302 shows the cumulative region counts, corresponding to the last column of Table 1.

The rule for alternate fill mode is that the region should be filled (marked as inside) if the cumulative count divided by 2 is an odd number. Thus, 0, 4, etc. are "outside" and are not filled while −2, 2, and so forth are "inside" and are filled. The resultant fill pattern is shown as 1304 where regions 1231 and 1246 as well as everything outside the combined outer boundary is not filled and is the outside of the shape.

The rule for winding fill mode is to fill (mark as inside) any region with a non-zero cumulative count. Thus, region 1231 is not filled as well as everything outside the combined outer boundary. The resultant fill pattern is shown as 1306.

Example Machine Architecture and Machine-Readable Medium

Figure 14:
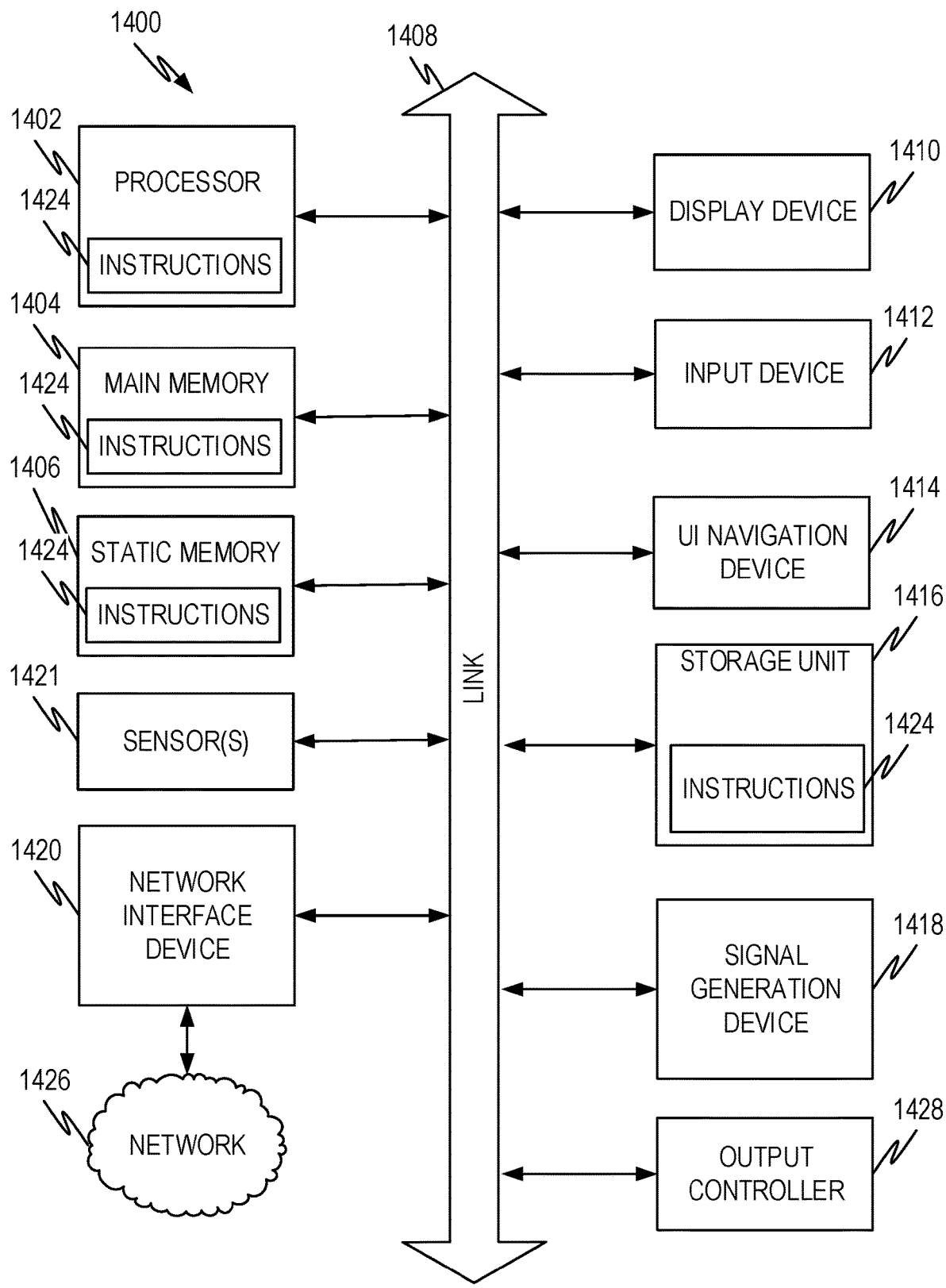
FIG. 14 illustrates a representative machine architecture suitable for implementing the systems and other aspects disclosed herein or for executing the methods disclosed herein.

FIG. 14 illustrates a representative machine architecture suitable for implementing the systems and other aspects disclosed herein or for executing the methods disclosed herein. The machine of FIG. 14 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 14 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1400 includes at least one processor 1402 (e.g., a central processing unit (CPU), a graphics processing unit (GPU), advanced processing unit (APU), or combinations thereof), one or more memories such as a main memory 1404, a static memory 1406, or other types of memory, which communicate with each other via link 1408. Link 1408 may be a bus or other type of connection channel. The machine 1400 may include further optional aspects such as a graphics display unit 1410 comprising any type of display. The machine 1400 may also include other optional aspects such as an alphanumeric input device 1412 (e.g., a keyboard, touch screen, and so forth), a user interface (UI) navigation device 1414 (e.g., a mouse, trackball, touch device, and so forth), a storage unit 1416 (e.g., disk drive or other storage device(s)), a signal generation device 1418 (e.g., a speaker), sensor(s) 1421 (e.g., global positioning sensor, accelerometer(s), microphone(s), camera(s), an eye tracking subsystem, and so forth), output controller 1428 (e.g., wired or wireless connection to connect and/or communicate with one or more other devices such as a universal serial bus (USB), near field communication (NFC), infrared (IR), serial/parallel bus, etc.), and a network interface device 1420 (e.g., wired and/or wireless) to connect to and/or communicate over one or more networks 1426.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the source separators 910 and other neural network aspects of the present disclosure. Based on the disclosure contained herein, those of skill in the art will know how to implement the embodiments of the present disclosure using one or more neural network chips.

Additionally, beamformers (e.g., beamformer 906) and microphone arrays (e.g., microphone array 904) are often implemented in whole or in part using discrete circuitry or specialized circuitry tailored to the design. This is particularly true where fixed beamformers such as those discussed that form beams at 30 degree offsets from each other are utilized with an appropriate array microphone. These are all suitable for implementation of embodiments of the present disclosure and those of skill in the art will understand how to implement embodiments of the present disclosure based on the disclosure contained herein.

Once the inside and outside have been distinguished and the distance values and/or sign appropriately adjusted, the signed distance field can be stored in one channel of the texture. Since textures have more than one channel (e.g., one channel each for the red, green, and blue information of the texture) additional information can be stored in the other channels of the texture. For example, a first channel can be used to store the signed distance field. A second channel can be used to store an unsigned distance field. A third channel can be used to store information about shape properties such as fill properties and/or line properties (width, dash size, join type, etc.). The texture can then be used to create high-resolution graphics as is known by those of skill in the art.

Executable Instructions and Machine-Storage Medium

The various memories (i.e., 1404, 1406, and/or memory of the processor(s) 1402 and/or storage unit 1416 may store one or more sets of instructions and data structures (e.g., software) 1424 embodying or utilized by any one or more of the methodologies or functions described herein. These instructions, when executed by processor(s) 1402 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, communication mechanisms, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1. A computer implemented method for creating a distance field, comprising:

receiving a list of points that defines a shape from which a distance field will be calculated;

define a plurality of shape segments which together form the shape from the list of points;

define a bounding box for each of the shape segments, the bounding box enclosing the segment and comprising a plurality of pixels;

for each pixel in each bounding box, calculate a distance from the pixel to the nearest point on the corresponding shape segment, thereby creating a distance field for the corresponding shape segment within the bounding box;

merging the distance fields for all shape segments to create an overall shape distance field; and storing the distance field in a texture.

Example 2. The method of example 1 wherein the method is executed by a graphics processing unit.

Example 3. The method of example 1 wherein prior to storing the distance field in a texture the method further comprises:

for each pixel in the overall shape distance field, determining whether the pixel in the overall shape distance field is on the inside of the shape or the outside of the shape;

responsive to determining the pixel in the overall shape distance field is on the inside of the shape, adjusting the value of the pixel to lie within a range of values that indicate the pixel lies within the inside of the shape; and responsive to determining the pixel in the overall shape distance field is on the outside of the shape, adjusting the value of the pixel to lie within a range of values that indicate the pixel lies within the outside of the shape.

Example 4. The method of example 3 wherein determining whether the pixel is on the inside of the shape or the outside of the shape comprises an overlap mode where areas of overlap between two shapes are considered to be on the outside of the shape.

Example 5. The method of example 3 wherein determining whether the pixel is on the inside of the shape or the outside of the shape comprises winding mode where areas of overlap between two shapes are considered to be on the outside of the shape when the shapes have different clockwiseness and on the inside of the shape when the shapes have the same clockwiseness.

Example 6. The method of example 1 wherein each shape segment comprises either a straight segment or a quadratic segment.

Example 7. The method of example 6 wherein when the shape segment is the straight line, the distance from the pixel to the nearest point on the corresponding shape segment is calculated by the method comprising:

responsive to determining that an orthogonal projection of the pixel onto the shape segment is between endpoints of the segment, the distance is calculated as the distance from the pixel to the segment along the orthogonal projection;

responsive to determining the orthogonal projection of the pixel onto the shape segment is not between endpoints of the segment, the distance is calculated as the distance between the pixel and the closest endpoint.

Example 8. The method of example 6 wherein when the shape segment is the quadratic segment, the distance from the pixel to the nearest point on the corresponding shape segment is calculated by determining the closest distance between a point and a segment of a parabola coincident with the quadratic segment.

Example 9. The method of example 1 wherein the resolution of the texture is selected based on a maximum anticipated zoom factor.

Example 10. The method of example 1 wherein the distance field is a signed distance field and the signed distance field is stored in one channel of the texture and wherein the method further comprises storing one or both of:

an unsigned distance field in a second channel of the texture; and line information stored in a third channel of the texture.

Example 11. A system comprising:

a processor coupled to memory storing executable instructions, which when executed by the processor cause the processor to perform operations comprising:

receiving a list of points that defines a shape from which a distance field will be calculated;

define a plurality of shape segments which together form the shape from the list of points;

define a bounding box for each of the shape segments, the bounding box enclosing the segment and comprising a plurality of pixels;

for each pixel in each bounding box, calculate a distance from the pixel to the nearest point on the corresponding shape segment, thereby creating a distance field for the corresponding shape segment within the bounding box;

merging the distance fields for all shape segments to create an overall shape distance field; and storing the distance field in a texture.

Example 12. The system of example 11 wherein the processor is a graphics processing unit.

Example 13. The system of example 11 wherein prior to storing the distance field in a texture the operations further comprise:

for each pixel in the overall shape distance field, determining whether the pixel in the overall shape distance field is on the inside of the shape or the outside of the shape;

responsive to determining the pixel in the overall shape distance field is on the inside of the shape, adjusting the value of the pixel to lie within a range of values that indicate the pixel lies within the inside of the shape; and responsive to determining the pixel in the overall shape distance field is on the outside of the shape, adjusting the value of the pixel to lie within a range of values that indicate the pixel lies within the outside of the shape.

Example 14. The system of example 13 wherein determining whether the pixel is on the inside of the shape or the outside of the shape comprises an overlap mode where areas of overlap between two shapes are considered to be on the outside of the shape.

Example 15. The system of example 13 wherein determining whether the pixel is on the inside of the shape or the outside of the shape comprises winding mode where areas of overlap between two shapes are considered to be on the outside of the shape when the shapes have different clockwiseness and on the inside of the shape when the shapes have the same clockwiseness.

Example 16. A computer implemented method for creating a distance field, comprising:

receiving information that defines a shape from which a distance field will be calculated;

define a plurality of shape segments which together form the shape from the information;

define a bounding box for each of the shape segments, the bounding box enclosing the segment and comprising a plurality of pixels;

for each pixel in each bounding box, calculate a distance from the pixel to the nearest point on the corresponding shape segment, thereby creating a distance field for the corresponding shape segment within the bounding box;

merging the distance fields for all shape segments to create an overall shape distance field; and storing the distance field in a texture.

Example 17. The method of example 16 wherein the method is executed by a graphics processing unit.

Example 18. The method of example 16, or 17 wherein prior to storing the distance field in a texture the method further comprises:

for each pixel in the overall shape distance field, determining whether the pixel in the overall shape distance field is on the inside of the shape or the outside of the shape;

responsive to determining the pixel in the overall shape distance field is on the inside of the shape, adjusting the value of the pixel to lie within a range of values that indicate the pixel lies within the inside of the shape; and responsive to determining the pixel in the overall shape distance field is on the outside of the shape, adjusting the value of the pixel to lie within a range of values that indicate the pixel lies within the outside of the shape.

Example 19. The method of example 18 wherein determining whether the pixel is on the inside of the shape or the outside of the shape comprises an overlap mode where areas of overlap between an even number of shapes are considered to be on the outside of the shape.

Example 20. The method of example 18 wherein determining whether the pixel is on the inside of the shape or the outside of the shape comprises winding mode where areas of overlap between two shapes are considered to be on the outside of the shape when the shapes have different clockwiseness and on the inside of the shape when the shapes have the same clockwiseness.

Example 21. The method of example 16, 17, 18, 19, or 20 wherein each shape segment comprises either a straight segment or a quadratic segment.

Example 22. The method of example 21 wherein when the shape segment is the straight line, the distance from the pixel to the nearest point on the corresponding shape segment is calculated by the method comprising:

responsive to determining that an orthogonal projection of the pixel onto the shape segment is between endpoints of the segment, the distance is calculated as the distance from the pixel to the segment along the orthogonal projection;
responsive to determining the orthogonal projection of the pixel onto the shape segment is not between endpoints of the segment, the distance is calculated as the distance between the pixel and the closest endpoint.

Example 23. The method of example 21 wherein when the shape segment is the quadratic segment, the distance from the pixel to the nearest point on the corresponding shape segment is calculated by determining the closest distance between a point and a segment of a parabola coincident with the quadratic segment.

Example 24. The method of example 16, 17, 18, 19, 20, 21, 22, or 23 wherein the resolution of the texture is selected based on a maximum anticipated zoom factor.

Example 25. The method of example 16, 17, 18, 19, 20, 21, 22, 23, or 24 wherein the distance field is a signed distance field and the signed distance field is stored in one channel of the texture and wherein the method further comprises storing one or both of:
an unsigned distance field in a second channel of the texture; and
line information stored in a third channel of the texture.

Example 26. The method of example 16, 17, 18, 19, 20, 21, 22, 23, 24, or 25 wherein merging the distance fields for all shape segments to create an overall shape distance field comprises:
evaluating a distance value of a pixel to two or more segments;
selecting as the distance value for the pixel to be the distance value to be the minimum of distance values to the two or more segments.

Example 27. The method of example 16, 17, 18, 19, 20, 21, 22, 23, 24, or 25 wherein merging the distance fields for all shape segments to create an overall shape distance field is performed as distance values for pixels in the texture are calculated.

Example 28. The method of example 16, 17, 18, 19, 20, 21, 22, 23, 24, 25, 26, or 27 wherein storing the distance field in the texture comprises storing one or more of the following in different channels of the texture:
a signed distance field;
an unsigned distance field; and
shape information used at rendering.

Example 29. An apparatus comprising means to perform a method as in any preceding example.

Example 30. Machine-readable storage including machine-readable instructions, when executed, to implement a method or realize an apparatus as in any preceding example.

Conclusion

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer-implemented method performed at runtime for creating a shape distance field for a shape, the method comprising:
receiving a list of points that defines the shape;
defining shape segments which together form the shape from the list of points;
defining a bounding box for each of the shape segments, the bounding box enclosing a shape segment and comprising pixels;
for each pixel in each bounding box, calculating a distance from a pixel to a nearest point on a corresponding shape segment, thereby creating a distance field for the corresponding shape segment within the bounding box;
merging distance fields for the shape segments to create the shape distance field for the shape;
prior to updating a texture to include the shape distance field for the shape:
for each pixel in the shape distance field, determining whether the pixel in the shape distance field is on an inside of the shape or an outside of the shape;
responsive to determining the pixel in the shape distance field is on the inside of the shape, adjusting a value of the pixel to lie within a range of values that indicate the pixel lies within the inside of the shape; and
responsive to determining the pixel in the shape distance field is on the outside of the shape, adjusting the value of the pixel in the shape distance field to lie within a range of values that indicate the pixel in the shape distance field lies outside of the shape; and
updating the texture to include the shape distance field for the shape, wherein the texture is stored in computer-readable storage, wherein graphical data is presented on a display based upon the shape distance field for the shape included in the texture.

2. The method of claim 1, wherein the method is executed by a graphics processing unit.

3. The method of claim 1, wherein determining whether the pixel in the shape distance field is on the inside of the shape or the outside of the shape comprises executing an overlap mode where areas of overlap between an even number of shapes are considered to be on the outside of the shape.

4. The method of claim 1, wherein each shape segment in the shape segments comprises either a straight segment or a quadratic segment.

5. The method of claim 4, wherein when the shape segment in the shape segments is the straight segment, the distance from the pixel to the nearest point on the corresponding shape segment is calculated by:
responsive to determining that an orthogonal projection of the pixel onto the corresponding shape segment is between endpoints of the corresponding shape segment, the distance is calculated as a distance from the pixel to the corresponding shape segment along the orthogonal projection; and
responsive to determining the orthogonal projection of the pixel onto the corresponding shape segment is not between endpoints of the corresponding shape segment, the distance is calculated as a distance between the pixel and a closest endpoint.

6. The method of claim 4, wherein when the shape segment in the shape segments is the quadratic segment, the distance from the pixel to the nearest point on the corresponding shape segment is calculated by determining a closest distance between a point and a segment of a parabola coincident with the quadratic segment.

7. The method of claim 1, wherein a resolution of the texture is selected based on a maximum anticipated zoom factor.

8. The method of claim 1, wherein the distance field is a signed distance field and the signed distance field is stored in a first channel of the texture, and further wherein the method further comprises storing one or both of:
- an unsigned distance field in a second channel of the texture; or
- line information in a third channel of the texture.

9. A system comprising:
a processor coupled to memory storing executable instructions, which when executed by the processor, cause the processor to perform operations comprising:
receiving a list of points that defines a shape;
defining shape segments which together form the shape from the list of points;
defining a bounding box for each of the shape segments, the bounding box enclosing a shape segment and comprising pixels;
for each pixel in each bounding box, calculating a distance from a pixel to a nearest point on a corresponding shape segment, thereby creating a distance field for the corresponding shape segment within the bounding box;
merging distance fields for the shape segments to create a shape distance field for the shape;
prior to updating a texture to include the shape distance field for the shape:
for each pixel in the shape distance field, determining whether the pixel in the shape distance field is on an inside of the shape or an outside of the shape;
responsive to determining the pixel in the shape distance field is on the inside of the shape, adjusting a value of the pixel to lie within a range of values that indicate the pixel lies within the inside of the shape; and
responsive to determining the pixel in the shape distance field is on the outside of the shape, adjusting the value of the pixel in the shape distance field to lie within a range of values that indicate the pixel in the shape distance field lies outside of the shape; and
updating the texture to include the shape distance field for the shape, wherein the texture is stored in computer-readable storage, wherein graphical data is presented on a display based upon the shape distance field for the shape included in the texture.

10. The system of claim 9, wherein determining whether the pixel is on the inside of the shape or the outside of the shape comprises executing an overlap mode where areas of overlap between two shapes are considered to be on the outside of the shape.

11. The system of claim 9, wherein each shape segment in the shape segments comprises either a straight segment or a quadratic segment.

12. The system of claim 11, wherein when the shape segment in the shape segments is the straight segment, the distance from the pixel to the nearest point on the corresponding shape segment is calculated by:
responsive to determining that an orthogonal projection of the pixel onto the corresponding shape segment is between endpoints of the corresponding shape segment, the distance is calculated as a distance from the pixel to the corresponding shape segment along the orthogonal projection; and
responsive to determining the orthogonal projection of the pixel onto the corresponding shape segment is not between endpoints of the corresponding shape segment, the distance is calculated as a distance between the pixel and a closest endpoint.

13. A computer storage medium comprising executable instructions that, when executed by a processor of a machine, cause the machine to perform acts comprising:
receiving information that defines a shape;
defining shape segments which together form the shape from the information;
defining a bounding box for each of the shape segments, the bounding box enclosing a shape segment and comprising pixels;
for each pixel in each bounding box, calculating a distance from a pixel to a nearest point on a corresponding shape segment, thereby creating a distance field for the corresponding shape segment within the bounding box;
merging distance fields for the shape segments to create a shape distance field for the shape;
prior to updating a texture to include the shape distance field for the shape:
for each pixel in the shape distance field, determining whether the pixel in the shape distance field is on an inside of the shape or an outside of the shape;
responsive to determining the pixel in the shape distance field is on the inside of the shape, adjusting a value of the pixel to lie within a range of values that indicate the pixel lies within the inside of the shape; and
responsive to determining the pixel in the shape distance field is on the outside of the shape, adjusting the value of the pixel in the shape distance field to lie within a range of values that indicate the pixel in the shape distance field lies outside of the shape; and
updating the texture to include the shape distance field for the shape, wherein the texture is stored in computer-readable storage, wherein graphical data is presented on a display based upon the shape distance field for the shape included in the texture.

14. The method of claim 1, wherein the shape comprises a first shape and a second shape, wherein determining whether the pixel is on the inside of the shape or the outside of the shape comprises determining whether:
both the first shape and the second shape have a clockwise direction or both the first shape and the second shape have a counterclockwise direction; or
the first shape has the clockwise direction and the second shape has the counterclockwise direction,
wherein the pixel is on the inside of the shape when both the first shape and the second shape have the clockwise direction or both the first shape and the second shape have the counterclockwise direction, wherein the pixel is on the outside of the shape when the first shape has the clockwise direction and the second shape has the counterclockwise direction.

15. The system of claim 9, wherein the shape comprises a first shape and a second shape, wherein determining whether the pixel is on the inside of the shape or the outside of the shape comprises determining whether:
both the first shape and the second shape have a clockwise direction or both the first shape and the second shape have a counterclockwise direction; or
the first shape has the clockwise direction and the second shape has the counterclockwise direction,
wherein the pixel is on the inside of the shape when both the first shape and the second shape have the clockwise direction or both the first shape and the second shape have the counterclockwise direction, wherein the pixel is on the outside of the shape when the first shape has the clockwise direction and the second shape has the counterclockwise direction.

16. The method of claim 1, wherein the shape distance field for the shape is created without tessellation.

17. The method of claim 1, wherein the graphical data is presented on the display based additionally upon a single pass fragment shader.

18. The system of claim 9, wherein the processor is a graphics processing unit (GPU), wherein each operation in the operations is performed by the GPU at run-time.

19. The computer-readable storage medium of claim 13, wherein the shape distance field for the shape is created without tessellation.

20. The computer-readable storage medium of claim 13, wherein the graphical data is presented on the display based additionally upon a single pass fragment shader.

* * * * *